United States Patent
Guo et al.

(10) Patent No.: US 11,482,247 B2
(45) Date of Patent: Oct. 25, 2022

(54) DATA STORAGE DEVICE WITH HISTORY DEPENDENT WRITE BOOST

(71) Applicant: Western Digital Technologies, Inc., San Jose, CA (US)

(72) Inventors: Guoxiao Guo, Irvine, CA (US); Charles A. Park, Aromas, CA (US); David Scott C. Amiss, San Francisco, CA (US); Duc H. Banh, San Jose, CA (US); Joey M. Poss, Rochester, MN (US); Weldon M. Hanson, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/182,589

(22) Filed: Feb. 23, 2021

(65) Prior Publication Data

US 2022/0246173 A1 Aug. 4, 2022

Related U.S. Application Data

(60) Provisional application No. 63/143,173, filed on Jan. 29, 2021.

(51) Int. Cl.
*G11B 5/596* (2006.01)
*G11B 5/127* (2006.01)
*G11B 5/00* (2006.01)

(52) U.S. Cl.
CPC ........ *G11B 5/59666* (2013.01); *G11B 5/1278* (2013.01); *G11B 5/59688* (2013.01); *G11B 2005/0018* (2013.01)

(58) Field of Classification Search
CPC ....................................................... G11B 5/09
See application file for complete search history.

(56) References Cited

U.S. PATENT DOCUMENTS

| | | | |
|---|---|---|---|
| 7,218,467 B2 * | 5/2007 | Kim | G11B 5/40 |
| 8,929,013 B1 | 1/2015 | Mastrocola et al. | |
| 8,929,186 B1 * | 1/2015 | Sharma | G11B 5/012 |
| | | | 369/47.53 |
| 9,111,561 B1 | 8/2015 | Contreras et al. | |
| 9,128,820 B1 * | 9/2015 | Malina | G06F 12/0253 |
| 9,129,628 B1 * | 9/2015 | Fallone | G11B 5/012 |
| 9,508,362 B2 * | 11/2016 | Gao | G11B 20/1889 |
| 9,842,617 B1 * | 12/2017 | Haralson | G11B 5/607 |

* cited by examiner

*Primary Examiner* — K. Wong
(74) *Attorney, Agent, or Firm* — Patterson & Sheridan, LLP; Steven H. VerSteeg

(57) ABSTRACT

A data storage device is disclosed comprising a head actuated over a magnetic media comprising a plurality of tracks. A first pattern of magnetic transitions is written to a first segment of a first track. Preparation is made to write a second pattern of magnetic transitions to a second segment of a second track adjacent the first segment of the first track. When the second pattern matches the first pattern, a write boost is configured to a first setting, and when the second pattern does not match the first pattern, the write boost is configured to a second setting. The second pattern of magnetic transitions is then written to the second segment of the second track using the configured write boost.

20 Claims, 4 Drawing Sheets

DATA STORAGE DEVICE WITH HISTORY DEPENDENT WRITE BOOST

CROSS REFERENCE TO RELATED APPLICATIONS

This application claims priority to U.S. Provisional Patent Application Ser. No. 63/143,173, filed on Jan. 29, 2021, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors 60-6N recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

DETAILED DESCRIPTION

Figures 2A, 2B:
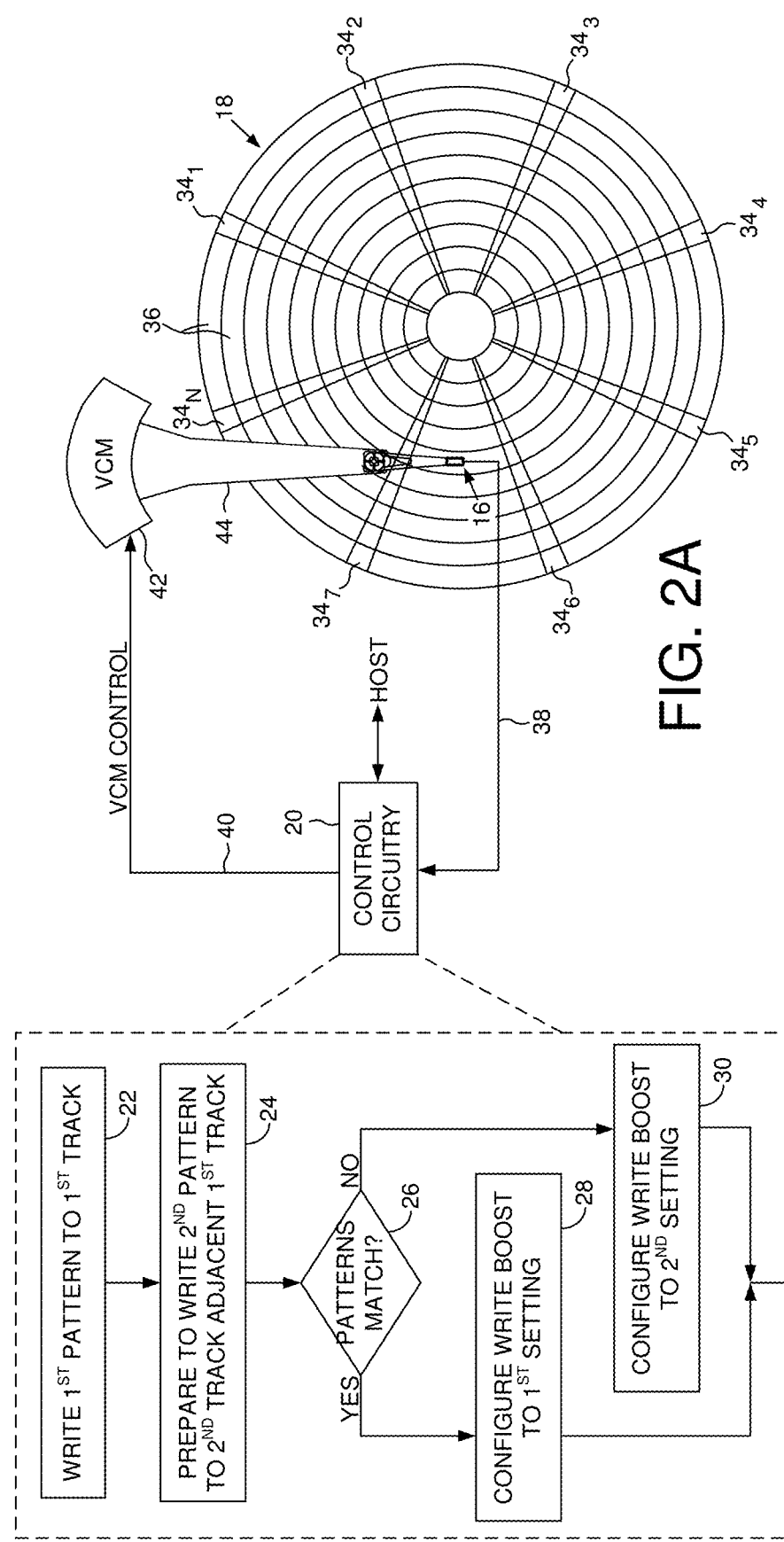
FIG. 2A shows a data storage device in the form of a disk drive according to an embodiment comprising a head actuated over a disk.
FIG. 2B is a flow diagram according to an embodiment wherein a write boost is configured depending on a history of previously written adjacent tracks.

FIG. 2A shows a data storage device in the form of a disk drive according to an embodiment comprising a head 16 actuated over a disk 18 comprising a plurality of tracks. While a disk drive is used as an illustrative example herein, various embodiments of the invention may be applied to, and/or include, other types of data storage device with magnetic media such as tape drives. The disk drive further comprises control circuitry 20 configured to execute the flow diagram of FIG. 2B, wherein a first pattern of magnetic transitions is written to a first segment of a first track (block 22). The control circuitry 20 then prepares to write a second pattern of magnetic transitions to a second segment of a second track adjacent the first segment of the first track (block 24). When the second pattern matches the first pattern (block 26), a write boost is configured to a first setting (block 28), and when the second pattern does not match the first pattern, the write boost is configured to a second setting (block 30). The second pattern of magnetic transitions is then written to the second segment of the second track using the configured write boost (block 32).

Figure 1:
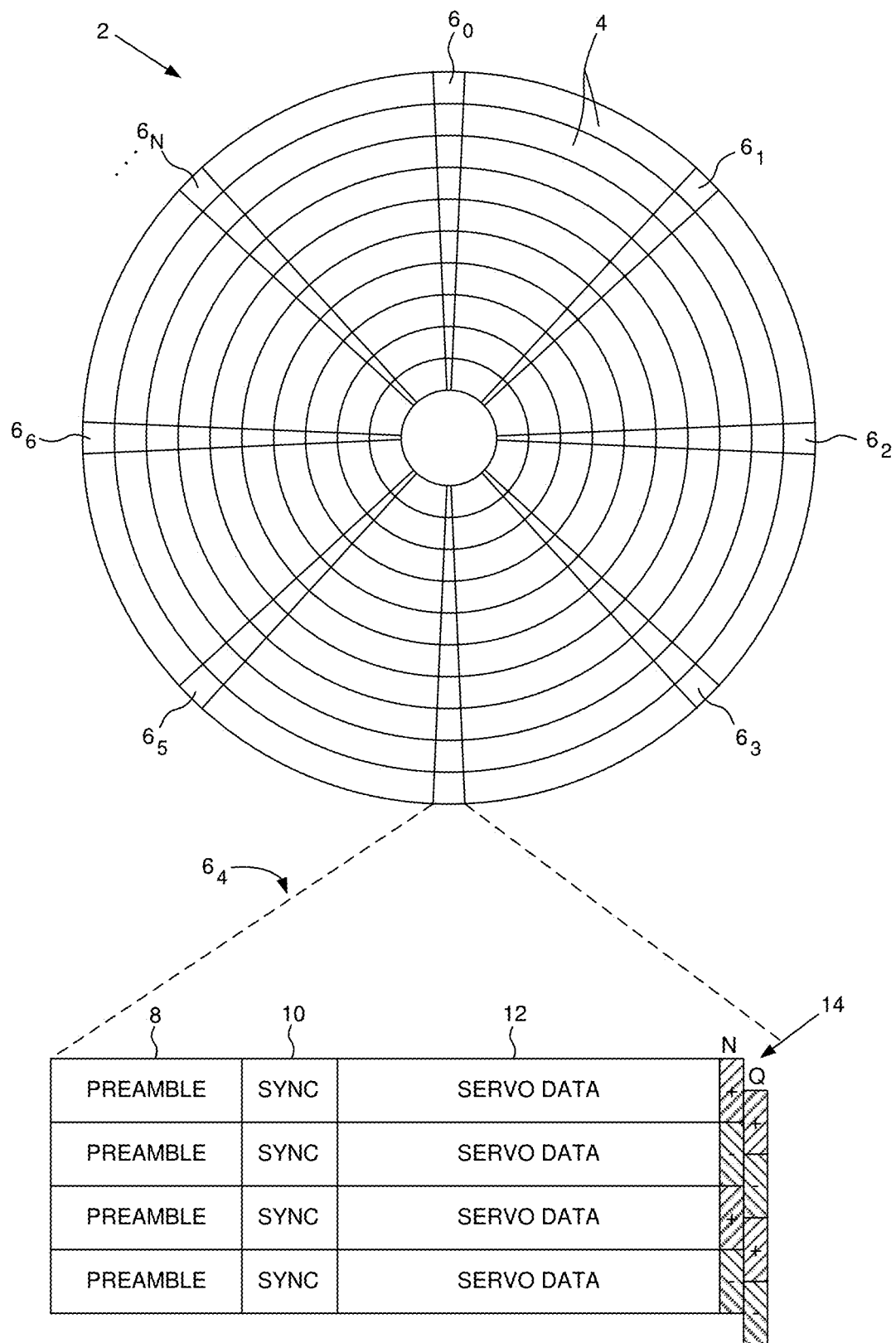
FIG. 1 shows a prior art disk format comprising a plurality of servo tracks defined by servo sectors.

In the embodiment of FIG. 2A, the disk 18 comprises a plurality of servo sectors $34_1$-$34_N$ that define a plurality of servo tracks 36, wherein data tracks are defined relative to the servo tracks at the same or different radial density. The control circuitry 20 processes a read signal 38 emanating from the head to demodulate the servo sectors and generate a position error signal (PES) representing an error between the actual position of the head and a target position relative to a target track. A servo control system in the control circuitry 20 filters the PES using a suitable compensation filter to generate a control signal 40 applied to a coarse actuator 42 (e.g., VCM) which rotates an actuator arm 44 about a pivot in order to actuate the head radially over the disk in a direction that reduces the PES. The head may also be servoed using a fine actuator, such as a piezoelectric (PZT) actuator, configured to actuate a suspension relative to the actuator arm 44, and/or configured to actuate the head relative to the suspension. The servo sectors $34_1$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
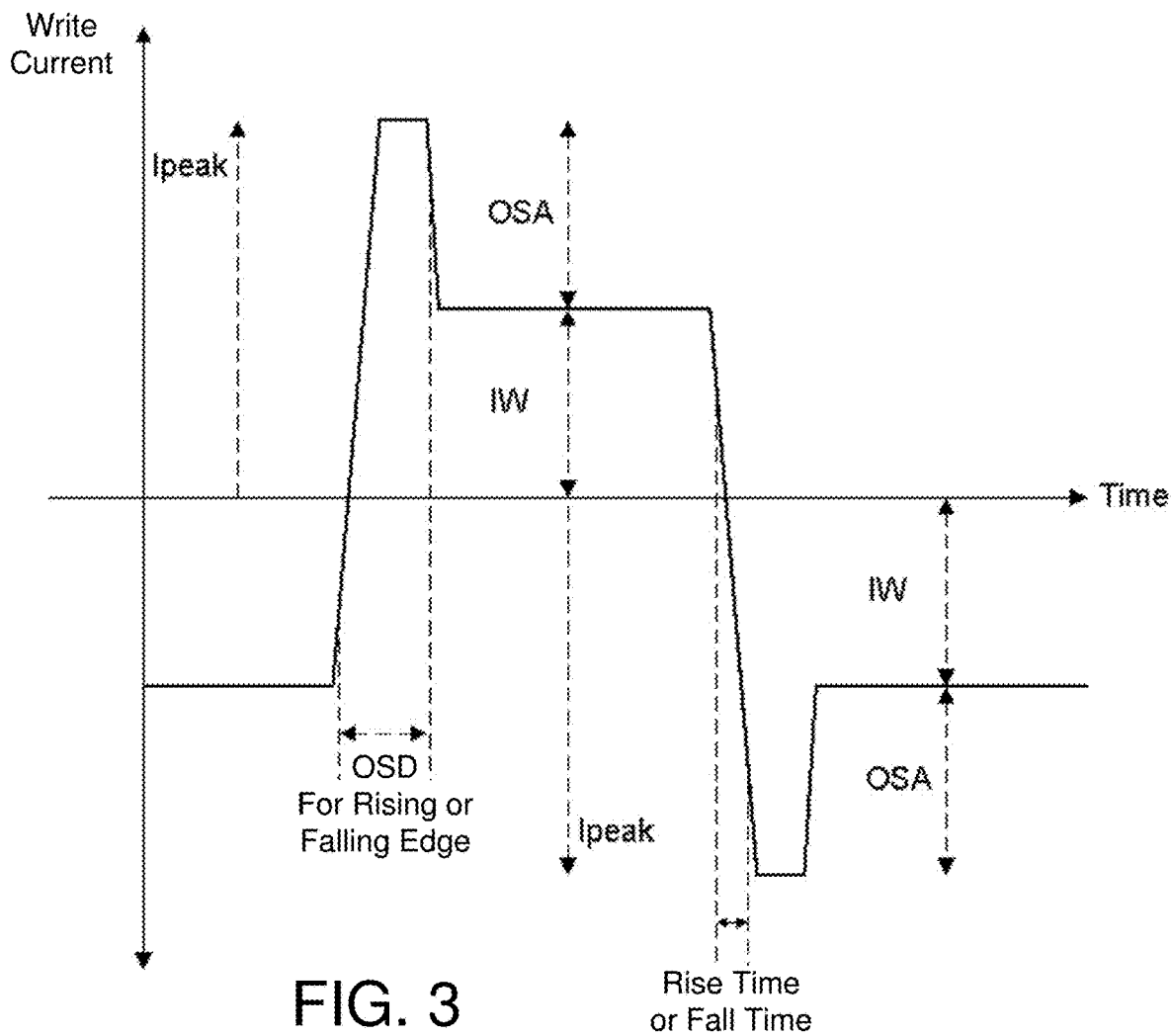
FIG. 3 shows an embodiment wherein the write boost comprises at least one of an amplitude of a write current, an overshoot amplitude of the write current, or an overshoot duration of the write current.

The fidelity of the magnetic transitions written onto the magnetic media, including the degradation of adjacent data tracks due to adjacent track interference (ATI) when writing to a target data track, may depend on a number of write parameters configured for the head. FIG. 3 shows an embodiment wherein the write parameters may include parameters of a write current (Iw) applied to a write coil of the head, including an amplitude of the write current, an overshoot amplitude (OSA) of the write current, and an overshoot duration (OSD) of the write current. In one embodiment, a write parameter may be boosted (i.e., write boost) depending on the pattern of magnetic transitions being written to the magnetic media. For example when writing a high frequency pattern of magnetic transitions, the write current OSA may be boosted in order to fully saturate the magnetic media, whereas when writing a lower frequency pattern of magnetic transitions, the write current OSA may be un-boosted while boosting the write current amplitude and/or OSD in order to reduce ATI.

Figure 4A:
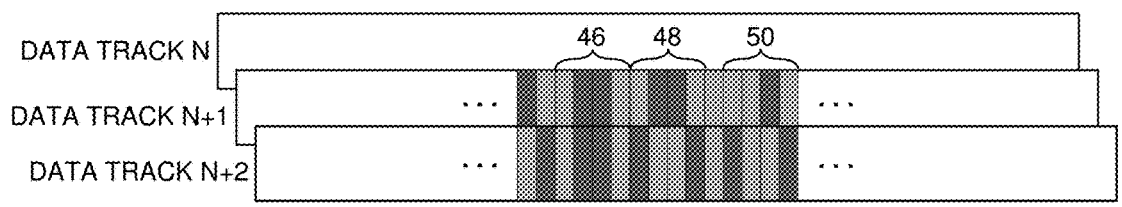
FIG. 4A shows an embodiment wherein data tracks are shingle written phase coherent such that at least some of the magnetic transitions of the previously written data track may match the magnetic transitions of a currently written data track.
Figure 4B:
FIG. 4B shows an embodiment wherein data tracks are conventionally written phase coherent such that at least some of the magnetic transitions of a previously written adjacent data track may match the magnetic transitions of a currently written data track.

In one embodiment, the data tracks may be written phase coherent from track to track meaning that the bit cells of adjacent data tracks are aligned. FIG. 4A shows an example of this embodiment wherein the data tracks are written in a shingled manner such that a previously written data track is at least partially overwritten with a currently written data track (shingled magnetic recording or SMR). FIG. 4B shows an example of data tracks being written using conventional magnetic recording (CMR) wherein the bit cells of adjacent data tracks are also aligned. In FIGS. 4A and 4B, the shade of each bit cell represents a polarity of magnetization of the magnetic medium by the head during a write operation (e.g., using longitudinal or perpendicular magnetic recording). When writing data track N+2 in FIG. 4A, at least part of the pattern of magnetic transitions may match the pattern of magnetic transitions in the previously written data track (data track N+1). For example, pattern 46 in data track N+1 matches the adjacent pattern when writing data track N+2, whereas pattern 48 in data track N+1 is opposite the adjacent pattern when writing data track N+2. Both patterns written to data track N+2 (adjacent to patterns 46 and 48 of data track N+1) may be considered a low frequency pattern which might be conventionally written using an un-boosted OSA and a boosted write current amplitude and/or OSD as described above. However when the pattern of magnetic transitions in data track N+2 does not match the pattern of magnetic transitions in data track N+1 (e.g., pattern 48), the fidelity of the recorded data in both data tracks may be improved by writing the pattern to data track N+2 using a modified write boost policy (e.g., with boosted write current amplitude and OSA and with un-boosted OSD) in order to improve the overwrite capability which is otherwise suppressed by the opposite polarity magnetic transitions in the adjacent data track N+1. When the pattern of magnetic transitions in data track N+2 is a partial match to the pattern of magnetic transitions in data track N+1 (e.g., pattern 50), the fidelity of the recorded data in both data tracks may be improved by writing the pattern to data track N+2 with yet another modified write boost policy (e.g., boosting OSA without boosting the write current amplitude). In one embodiment, the write boost policy may also be modified when writing high frequency magnetic transitions to data track N+2 depending on whether the magnetic transitions match the adjacent data track.

In general when writing to data track N+2, the write boost may be configured based on the history of the data written to data track N+1 when shingle writing the data tracks (i.e., history dependent write boost). When writing to data track N+1 using CMR as in FIG. 4B, the write boost may be configured based on the history of the data written to both the adjacent data tracks N and N+2. In addition when writing to data track N+1 using CMR, the write boost may be configured based on whether the pattern of magnetic transitions match (or partially match) when compared to each of the adjacent data tracks N and N+2. For example, the write boost may be configured to a first setting when the patterns match in both adjacent data tracks, and the write boost may be configured to a second setting when the patterns match (or partially match) in only one of the adjacent data tracks.

Figure 5A:
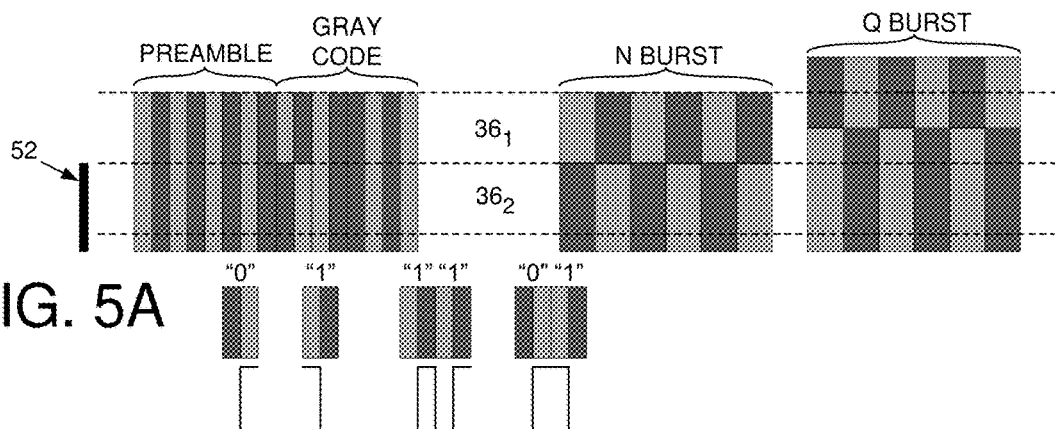
FIG. 5A shows an example of a servo sector written to the disk using biphase modulation.

In one embodiment, the servo sectors $34_1$-$34_N$ that define the servo tracks 36 may be written phase coherent so that the bit cells and servo bursts of adjacent servo sectors are aligned. The servo sectors may be written using any suitable modulation technique, wherein in an embodiment shown in FIG. 5A, a servo sector is written using biphase modulation where a "0" bit is written with a magnetic transition having a first polarity change and a "1" bit is written with a magnetic transition having a second polarity change opposite the first polarity change. When writing consecutive "1" bits or consecutive "0" bits the result is a pattern of high frequency magnetic transitions, and when writing a "01" bit sequence or a "10" bit sequence the result is a pattern of lower frequency magnetic transitions as shown in FIG. 5A. In one embodiment, the servo sectors may be "self written" by the control circuitry 20 internal to the data storage device, for example, during a manufacturing procedure. In another embodiment, an external servo writer may be used to servo write the servo sectors onto a disk, and then the servo written disk may be installed into a production disk drive. Accordingly in one embodiment, an external servo writer may be considered a data storage device configured to write the servo sectors to the disk by configuring the write boost depending on the history of the magnetic transitions in a previously written servo track.

FIG. 5A shows a write element 52 of the head 16 positioned to write the servo preamble, Gray code representing the servo track address, and N and Q servo bursts of servo track $36_2$. In this embodiment, the write element 52 is wider than the width of the servo track such that when writing servo track $36_2$ the previously written servo track $36_1$ is "trimmed". The servo preamble in this embodiment is written with a high frequency pattern of magnetic transitions and the write boost configured accordingly. However the servo Gray code may be written with both high frequency and low frequency patterns of magnetic transitions as shown in FIG. 5A. In addition, the Gray code encodes the servo track address so that a single bit changes between servo tracks such as shown in the example of FIG. 5A. When writing servo track $36_2$ the magnetic transitions of the Gray code match the magnetic transitions of the previously written servo track $36_1$ except for a single bit. Accordingly in this embodiment when writing the Gray code the write boost is configured depending on the history of the previously written servo track (i.e., depending on the whether the pattern of magnetic transitions being written matches the magnetic transitions in the previously written servo track). In one embodiment when the patterns don't match, it means more write boost is needed to improve the overwrite capability to overcome the effect of the opposite polarity magnet transitions in the previously written adjacent servo track as described above.

Figure 5B:
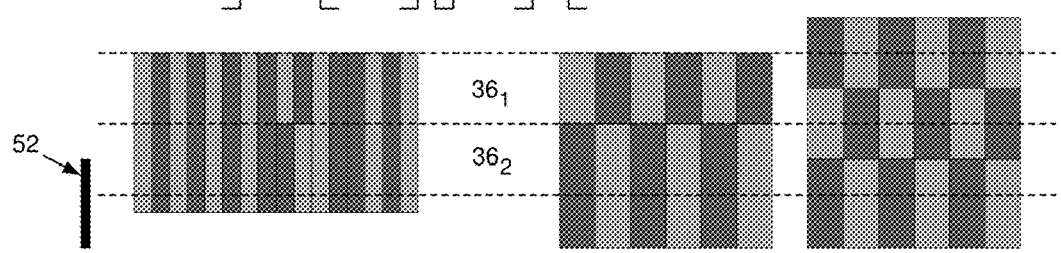
FIG. 5B shows the Q bursts being written in opposite phase from previously written Q bursts according to an embodiment.
Figure 5C:
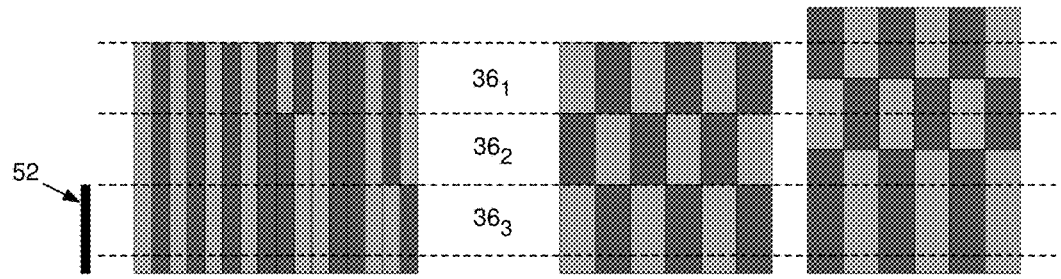
FIG. 5C shows the Q bursts being written with the same phase as the previously written Q bursts according to an embodiment.

When writing the Q servo bursts of servo track $36_2$ in the example of FIG. 5A, the previously written Q servo bursts in servo track $36_1$ are effectively extended by the trimming operation. In other words, the low frequency pattern of magnetic transitions representing the Q servo bursts have the same polarity as the previously written Q servo bursts and therefore the write boost is configured accordingly (e.g., with boosted write current amplitude and OSD and un-boosted OSA). However when writing the N servo bursts of servo track $36_2$ in the example of FIG. 5A, the polarity of the magnetic transitions is opposite of the previously written N servo busts (written for servo track $36_1$). Accordingly when writing the N servo bursts of servo track $36_2$ the write boost may be configured accordingly (e.g., with boosted write current amplitude and OSA and un-boosted OSD) in order to optimize the fidelity of the N servo bursts for both servo track $36_1$ and servo track $36_2$. In the example of FIG. 5B, the write element 52 is positioned to extend the N servo bursts, trim the Q servo busts for servo track $36_2$, and write the Q servo bursts for servo track $36_3$. Trimming the previously written Q servo bursts in FIG. 5B means the currently written Q servo bursts are written with the opposite polarity of magnetic transitions, and therefore the Q servo bursts may be written with the write boost configured accordingly. FIG. 5C shows the continued writing of the servo sectors wherein the N servo bursts of servo track $36_2$ are trimmed and the Q servo bursts are extended.

In the example embodiment shown in FIGS. 5A-5C the servo preamble and Gray code are written at a full servo track resolution, whereas the N and Q servo bursts are written at a half servo track resolution. In another embodiment, the servo preamble and Gray code may also be written at a half servo track resolution. In this embodiment when writing the Gray code at the half servo track location such as shown in FIG. 5B, all of the bits of the Gray code are the same as previously written and therefore the write boost is configured for matching magnetic transitions.

Figure 6:
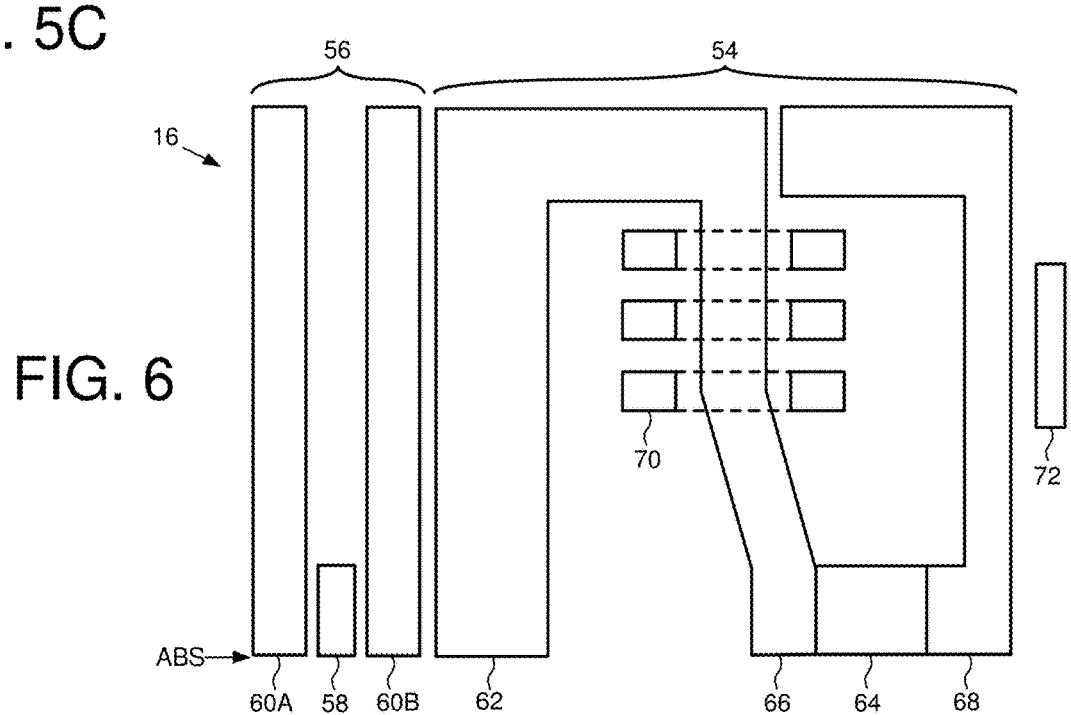
FIG. 6 shows a cross-section of a head comprising a write assist element (e.g., a laser for HAMR or a STO for MAMR) according to an embodiment.

FIG. 6 shows a cross-sectional view of a suitable head 16 according to an embodiment, wherein the head 16 may comprise more or fewer elements in various other embodiments. In the embodiment of FIG. 6, the head 16 comprises write elements 54 configured to write data to the disk surface, and read elements 56 configured to read data from the disk surface. The bottom surface of the head 16 facing the disk surface is referred to as an air bearing surface (ABS) wherein an air bearing forms between the head 16 and the disk surface due to the disk spinning such that the head 16 effectively flies above the disk surface. The read elements 56 of the head 16 may comprise a magnetoresistive (MR) read element 58 that is fabricated between MR shields 60A and 60B. Other embodiments may employ a different read element, such as a suitable magnetic tunneling junction (MTJ) read element. The write elements 54 comprise a return pole 62, a write assist element 64 (e.g., a suitable laser and NFT in HAMR, a STO in MAMR, or a material stack, including conductive materials, used in energy assisted recording) fabricated between a main pole 66 and a trailing shield 68, and a write coil 70 that excites the main pole 66 to generate a magnetic write field that magnetizes the disk surface, thereby writing data to the disk surface. The head 16 may also comprise a fly height actuator (FHA) 72 that is biased to achieve a target fly height of the head 16 over the disk surface. Any suitable FHA 72 may be employed, such as a suitable thermal actuator that adjusts the fly height through thermal expansion, or a suitable mechanical actuator such as a suitable piezoelectric actuator that adjusts the fly height through mechanical deflection.

In one embodiment, the write boost that is configured when writing user data to a data track and/or when writing a servo sector to a servo track may comprise a parameter of a write assist bias applied to the write assist element 64 shown in FIG. 6, such as parameter(s) of a bias signal applied to a laser, STO, or other suitable material stack for energy assisted recording. In one embodiment, the parameters configured for the write assist element 64 may be similar to the parameters configured to the write current such as shown in FIG. 3 (e.g., bias amplitude, OSA, OSD, etc.). In one embodiment, a write boost may be configured for both the write current and the write assist element 64 depending on the history of data written in the adjacent track(s) in order to optimize the fidelity of the recorded magnetic transitions as described above.

When writing the data tracks using SMR or when servo writing the servo sectors to define the servo tracks, in one embodiment the history of the previously written track may be maintained in a buffer in order to compare the patterns of magnetic transitions written to each track. When writing the data tracks using CMR, in one embodiment the history of the previously written adjacent data tracks may be reconstructed by reading each of the adjacent data tracks prior to writing a target data track. When writing a plurality of consecutive data tracks using CMR, the history of the previously written adjacent data track may be buffered similar to when writing using SMR.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a magnetic media comprising a plurality of tracks;
a head actuated over the magnetic media; and
control circuitry configured to:
 write a first pattern of magnetic transitions to a first segment of a first track;
 prepare to write a second pattern of magnetic transitions to a second segment of a second track adjacent the first segment of the first track;
 when the second pattern matches the first pattern, configure a write boost to a first setting;
 when the second pattern does not match the first pattern, configure the write boost to a second setting that is different from the first setting; and
 write the second pattern of magnetic transitions to the second segment of the second track using the configured write boost.

2. The data storage device as recited in claim 1, wherein the write boost comprises at least one of an amplitude of a write current, an overshoot amplitude of the write current, or an overshoot duration of the write current.

3. The data storage device as recited in claim 1, wherein the write boost comprises at least one of an amplitude of a laser current, an overshoot amplitude of the laser current, or an overshoot duration of the laser current.

4. The data storage device as recited in claim 1, wherein the write boost comprises at least one of an amplitude of a write assist bias, an overshoot amplitude of the write assist bias, or an overshoot duration of the write assist bias.

5. The data storage device as recited in claim 1, wherein the first track is a first data track and the second track is a second data track.

6. The data storage device as recited in claim 5, wherein the second data track is shingle written to partially overlap the first data track using shingled magnetic recording (SMR).

7. The data storage device as recited in claim 5, wherein the second data track is conventionally written using conventional magnetic recording (CMR).

8. The data storage device as recited in claim 1, wherein the first track is a first servo track and the second track is a second servo track.

9. The data storage device as recited in claim 8, wherein the second servo track is written by trimming the first servo track.

10. The data storage device as recited in claim 1, wherein the second setting to increases the write boost relative to the first setting.

11. A data storage device comprising:
a magnetic media comprising a plurality of tracks;
a head actuated over the magnetic media; and
control circuitry configured to:
 write a first pattern of magnetic transitions to a first segment of a first track;
 prepare to write a second pattern of magnetic transitions to a second segment of a second track adjacent the first segment of the first track;
 configure a write boost based on the first pattern and the second pattern, wherein the write boost is increased when the second pattern does not match the first pattern; and
 write the second pattern of magnetic transitions to the second segment of the second track using the configured write boost.

12. The data storage device as recited in claim 11, wherein the write boost comprises at least one of an amplitude of a write current, an overshoot amplitude of the write current, or an overshoot duration of the write current.

13. The data storage device as recited in claim 11, wherein the write boost comprises at least one of an amplitude of a laser current, an overshoot amplitude of the laser current, or an overshoot duration of the laser current.

14. The data storage device as recited in claim 11, wherein the write boost comprises at least one of an amplitude of a write assist bias, an overshoot amplitude of the write assist bias, or an overshoot duration of the write assist bias.

15. The data storage device as recited in claim 11, wherein the first track is a first data track and the second track is a second data track.

16. The data storage device as recited in claim 15, wherein the second data track is shingle written to partially overlap the first data track using shingled magnetic recording (SMR).

17. The data storage device as recited in claim 15, wherein the second data track is conventionally written using conventional magnetic recording (CMR).

18. The data storage device as recited in claim 11, wherein the first track is a first servo track and the second track is a second servo track.

19. The data storage device as recited in claim 11, wherein the write boost is increased relative to a setting when the second pattern matches the first pattern.

20. A data storage device comprising:
   a magnetic media comprising a plurality of tracks;
   a head actuated over the magnetic media; and
   a means for writing a first pattern of magnetic transitions to a first segment of a first track;
   a means for preparing to write a second pattern of magnetic transitions to a second segment of a second track adjacent the first segment of the first track;
   a means for configuring a write boost based on the first pattern and the second pattern, the configuring comprising
      configuring the write boost to a first setting when the second pattern matches the first pattern, and
      configuring the write boost to a second setting that is different from the first setting when the second pattern does not match the first pattern; and
   a means for writing the second pattern of magnetic transitions to the second segment of the second track using the configured write boost.

* * * * *